Aug. 1, 1967  H. EYBERGER  3,333,497

MATERIAL FEED APPARATUS

Filed May 24, 1966  7 Sheets-Sheet 1

INVENTOR.
HARRY EYBERGER
BY
Hall, Pollock & Vande Sande

HIS ATTORNEY

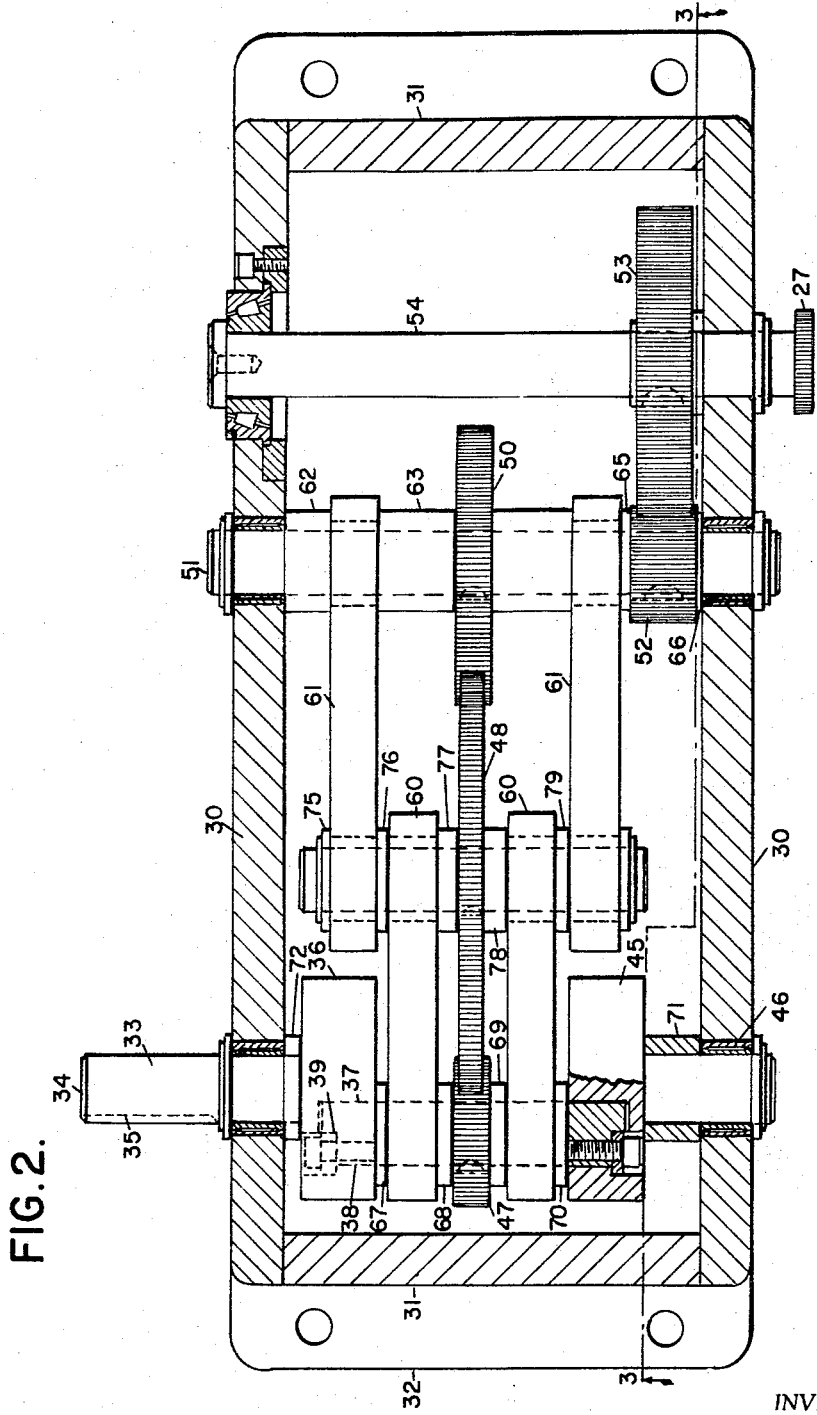

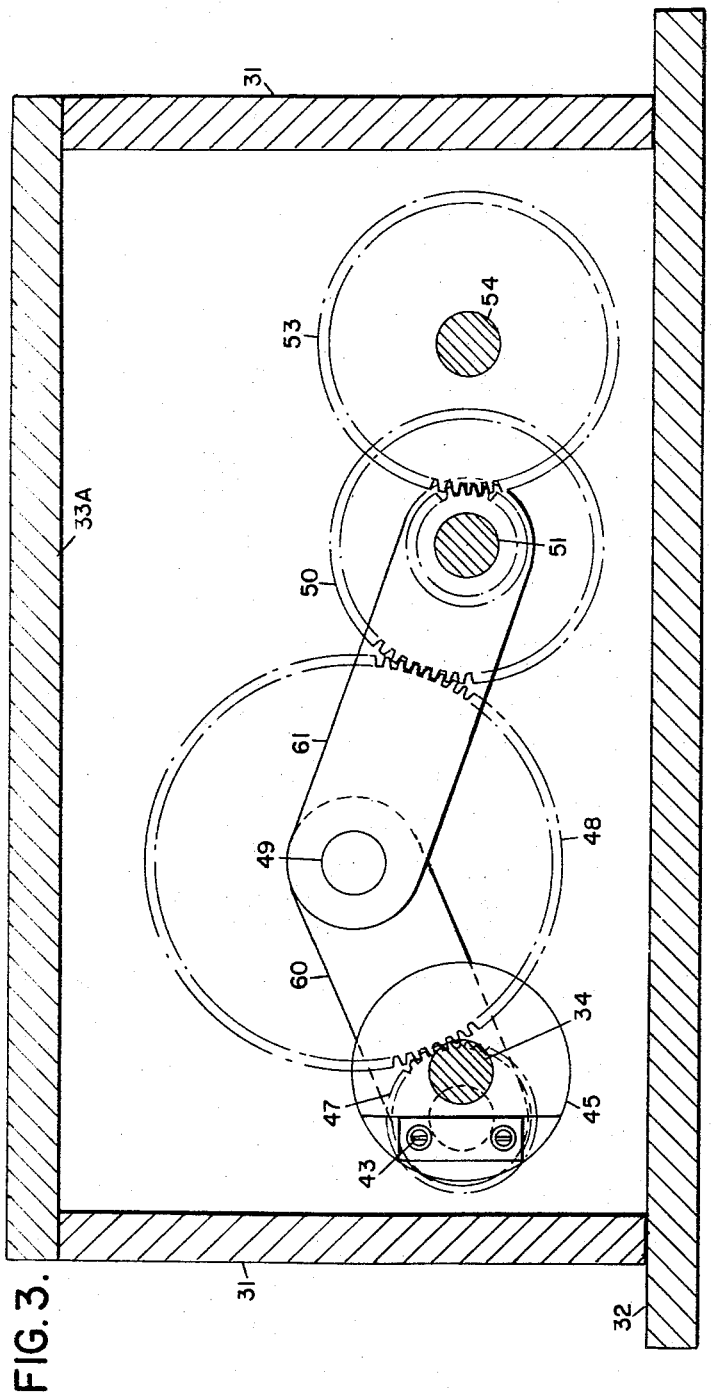
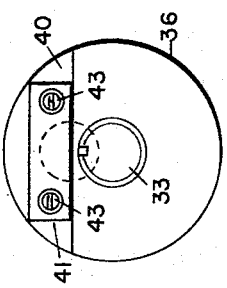
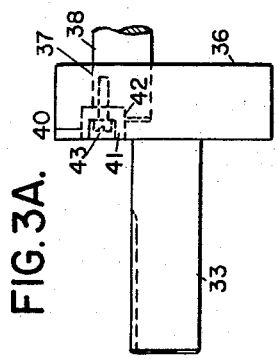

Aug. 1, 1967 H. EYBERGER 3,333,497
MATERIAL FEED APPARATUS
Filed May 24, 1966 7 Sheets-Sheet 4
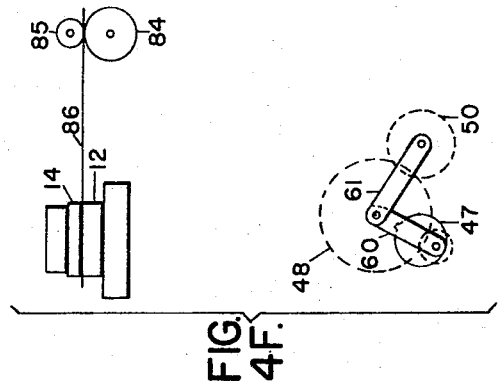
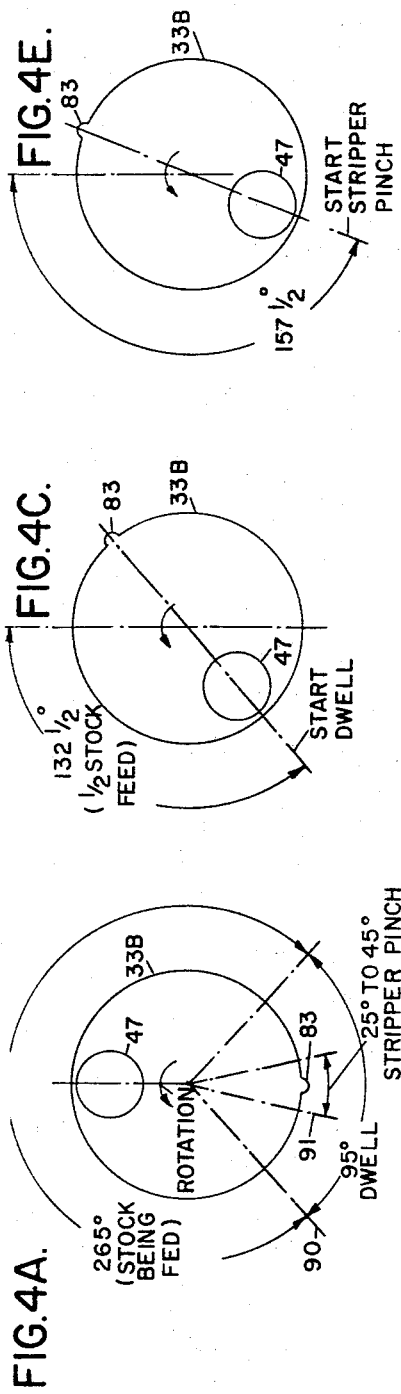
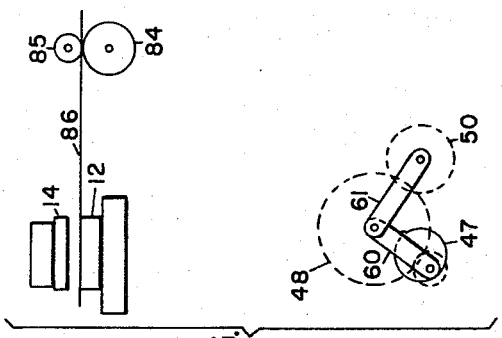
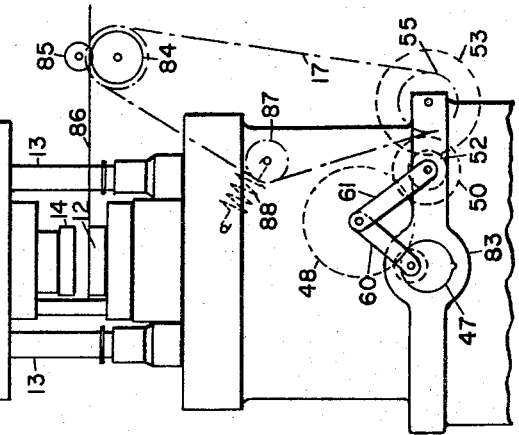
INVENTOR.
HARRY EYBERGER
BY
Hall, Pollock & Vande Sande
HIS ATTORNEY Aug. 1, 1967 H. EYBERGER 3,333,497
MATERIAL FEED APPARATUS
Filed May 24, 1966 7 Sheets-Sheet 5

INVENTOR.
HARRY EYBERGER
BY
Hall, Pollock & Vande Sande
HIS ATTORNEY

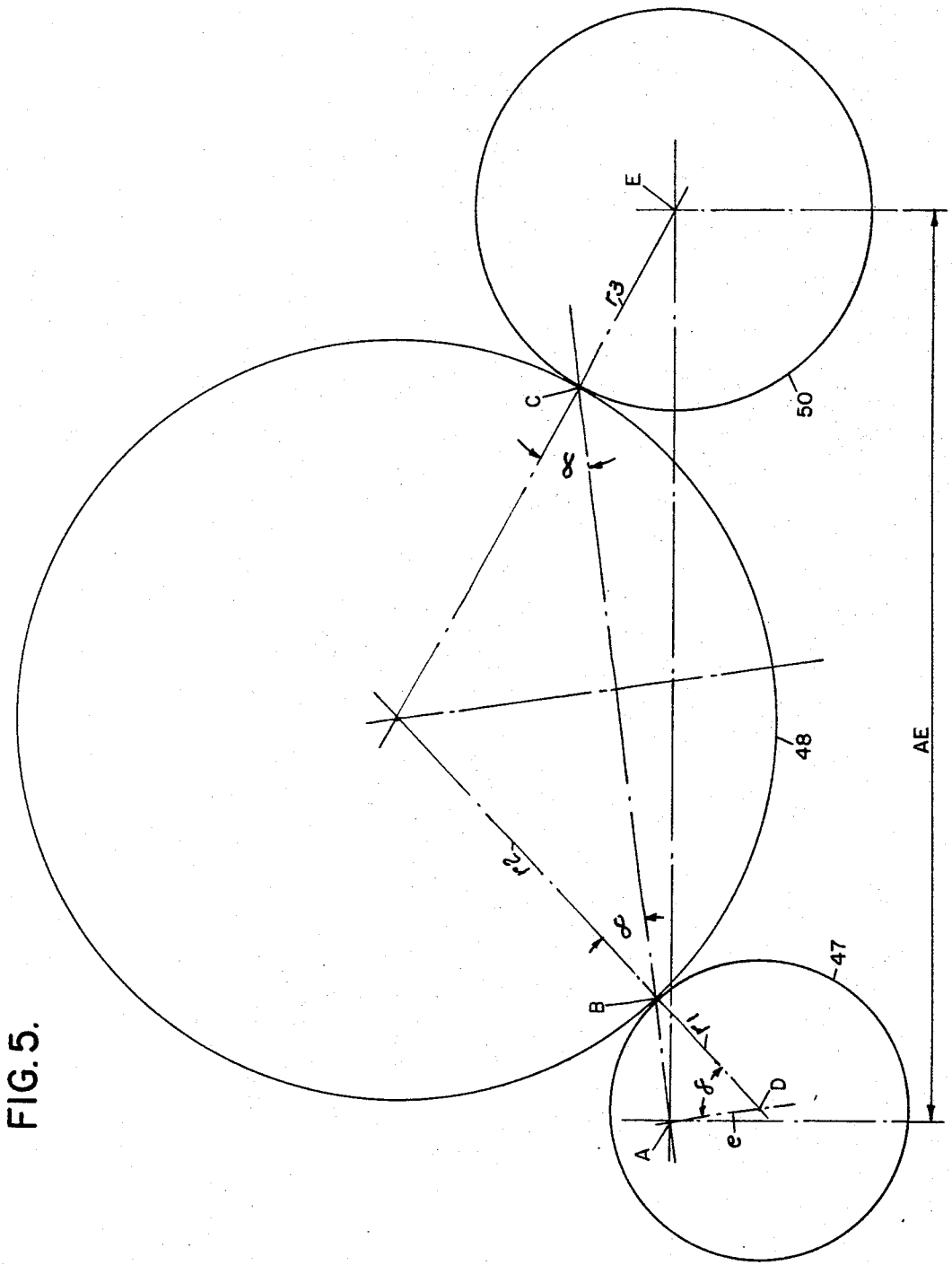

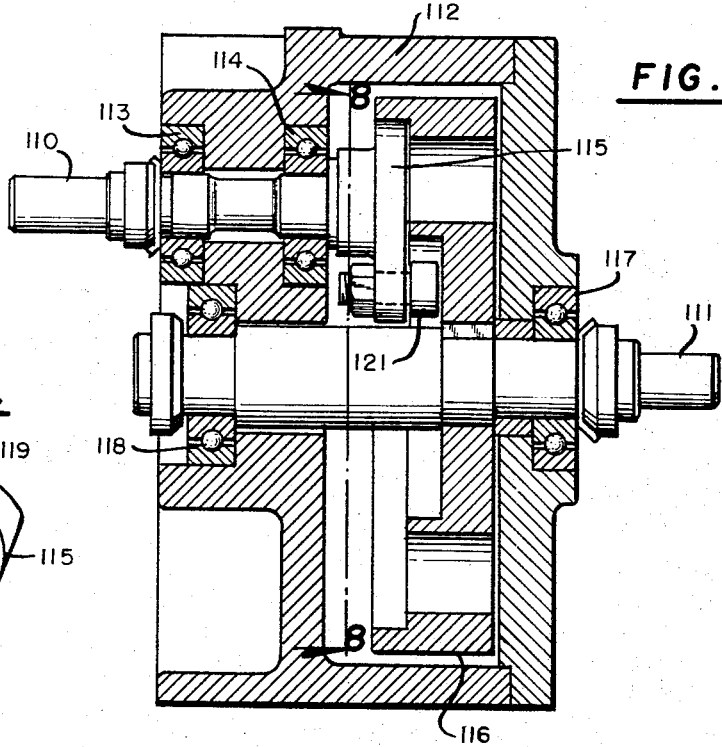
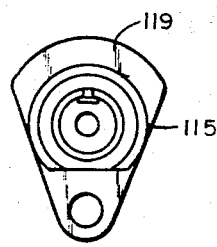
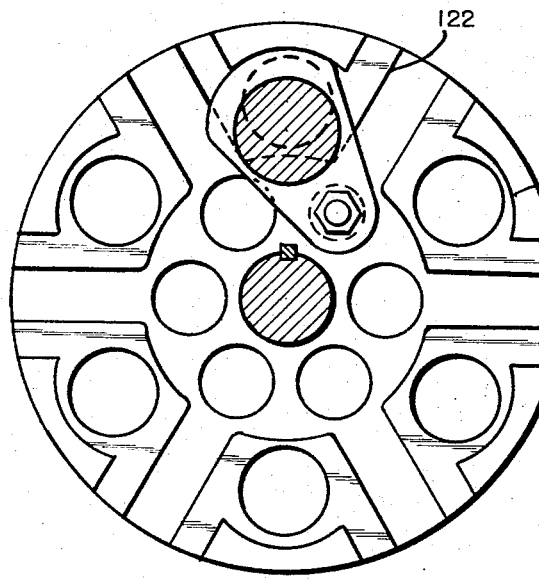
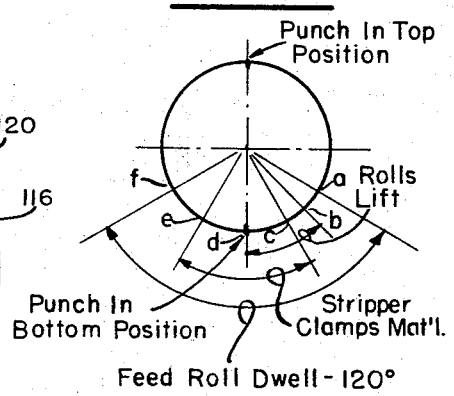

United States Patent Office 3,333,497
Patented Aug. 1, 1967

3,333,497
MATERIAL FEED APPARATUS
Harry Eyberger, Cherry Hill, N.J., assignor to Magnetic Metals Company, Camden, N.J.
Filed May 24, 1966, Ser. No. 568,690
7 Claims. (Cl. 83—241)

This application is a continuation-in-part of copending application Ser. No. 442,026, filed Mar. 23, 1965, and now abandoned.

This invention relates to apparatus for feeding material to a machine or the like, and more particularly pertains to apparatus for feeding strip or sheet material to a punch press or similar machine.

In the formation of complex and intricately shaped parts by means of a punch press, it is common practice to punch only a small portion of the entire pattern at each of successive "stations." This requires that the apparatus controlling the feed of the material to the punch press be capable of controlling accurately the amount by which the material is fed for each cycle of operation in order that the punching operation as carried out at any station after the first shall register properly with the punches previously made. In many instances, it is necessary that the feed travel of the strip be controlled within a tolerance of about one one-thousandth of an inch.

One prior art apparatus used for the control of the feed strip material to a punch press makes use of electromagnetically operated clutches and brakes. In such apparatus, a friction brake is employed which is continually effective to apply a braking force to the feed rolls. When it is desired to advance the strip for a successive punching operation, a clutch is engaged, thereby enabling driving power to be applied thereto through the feed rolls so that they are rotated against the braking action applied by the brake. When the driving power is removed by disengaging the clutch, the feed rolls are brought to a quick stop by the brake. The disadvantages of this prior art apparatus are that the brake surfaces tend to glaze and wear so that the effectiveness of the brake varies with time with the result that the braking force opposing the driving force applied through the clutch is not uniform. Also, the grabbing effect of the clutch on the feed rolls is not uniform over long periods of time, and the clutch may tend to slip. In addition, the sudden application and removal of turning moment to the feed rolls is not gradual when brakes and clutches are used, and this, together with the disadvantages previously mentioned, tends to produce appreciable error in the amount of rotational motion imparted to the feed roll for each cycle of operation. Thus, it becomes extremely difficult to ensure that the strip will be fed the correct amount.

Still other prior art apparatus has been devised for the feeding of strip material, but apparatus which overcomes the disadvantages just stated has the disadvantage of being very costly. Accordingly, it is an aspect of this invention to provide apparatus for controlling the feeding of strip material which is not only highly accurate but is also low in cost.

Another advantage which is obtained through use of the feed apparatus of the present invention is the elimination, in some instances, of the need for registration holes in the strip material. More specifically, the lack of high accuracy of some of the prior art apparatus makes it necessary to provide registration holes in the strip, which holes are spaced a distance equal to the amount that the material is to be advanced for each cycle of operation of the press. Corresponding pins are provided near the die of the punch press and accurate registration of the strip is obtainable only by providing means which ensures that the holes in the strip will each receive a respective one of the pins. In other words, the feed mechanism of such prior art apparatus advances the strip only approximately to the desired position, and thereafter the strip is moved into the exact desired position by registering at least one hole with a corresponding pin. By use of the apparatus of the present invention, however, the accuracy which is obtainable is of such a high order that the registration holes and corresponding pins can be entirely dispensed with in many instances.

When registration holes and pins are employed, it then becomes necessary to release the rollers which feed the strip material just prior to the actual punching operation so that the strip can be shifted in position slightly and thus properly aligned with the registering pins. Of course, with the apparatus of the present invention, which makes possible the elimination of such registering holes and registering pins in some instances, this release of the strip material by the rollers to effect proper registration is not required. It is, however, desirable to release the rollers momentarily during some portion of the cycle of operation in order that the strip can periodically be aligned with the die in a direction transverse to the direction of strip feed. As will be described in detail later, one aspect of this invention is the provision of means which releases the feed rolls but does so only when the strip is securely held by the stripper. Thus, even though release of the rollers is desirable with the improved apparatus of this invention, this can still be effectively carried out without requiring any additional means to hold the strip at the time the rollers are released since this operation is automatically effected during that portion of the cycle when the strip is securely held by the punch.

It is at times still desirable, even with the apparatus of the present invention, to use registering holes in the strip material and corresponding pins in the die. This may be desirable particularly where extremely high accuracy is required and where it is wished to provide for very accurate registration of the strip material in a lateral direction, i.e. a direction transverse to the direction of feed of the strip material.

It is accordingly an object of this invention to provide new and improved means for the feeding of strip or sheet material to a machine such as a punch press, with the amount of advance of the material for each cycle being accurately maintained within close limits.

It is a further object of the invention to provide strip feed apparatus for a punch press which is of relatively low cost as compared to the prior art apparatus having corresponding accuracy and which is relatively simple to manufacture and requires a minimum of maintenance.

It is a further object of this invention to provide apparatus for the feeding of strip material to a machine such as a punch press where the accuracy of feed is of such a high order that no guide holes and guide pins are required to accurately position the strip material.

It is another object of the invention to provide a feed mechanism for a punch press or the like having feed rolls which are subjected to only gradual acceleration and deceleration.

It is another object of this invention to provide apparatus for the feeding of strip material to a punch press or the like which includes means for releasing the feed rolls momentarily at the time the material is securely held between the die shoe and punch.

Other objects, purposes, characteristic features of the invention will in part be obvious from the accompanying drawings and in part pointed out as the description of the invention progresses.

In describing the invention, reference will be made to the accompanying drawings in which like reference characters designate corresponding parts throughout the several views.

In the drawings:

FIGURE 2 is a plan view of the feed drive mechanism of the present invention;

FIGURE 3 is a side view of the apparatus shown in FIGURE 2;

Figure 6:
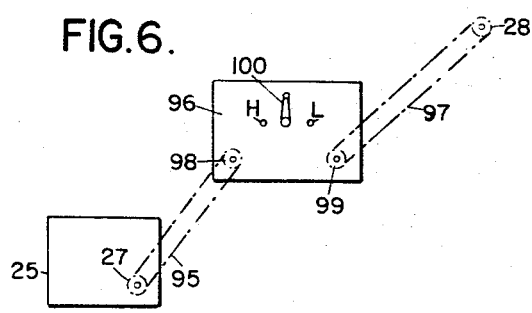

FIGURES 3A and 3B comprise front and side views, respectively, of the eccentric gear drive portion of the apparatus shown in FIGURES 2 and 3;

FIGURES 4A–4J comprise diagrammatic illustrations of the feed drive mechanism to show the mode of operation at various portions of a complete cycle of operation; and FIGURE 5 is a diagrammatic illustration of the gears of the feed drive mechanism of the invention particularly illustrating the various parameters involved in controlling the amount of dwell;

FIGURE 6 diagrammatically illustrates a modification of the invention employing a variable speed drive mechanism; and FIGURE 7 is a cross-sectional view of an alternative embodiment of the invention employing a Geneva cam mechanism;

FIGURE 8 is a cross-sectional view taken along the line 8—8 of FIGURE 7; and

FIGURE 9 is a view of the cam element shown in FIGURES 7 and 8.

Described briefly, the present invention comprises, in part, as one embodiment thereof, a three-gear mechanism in which the input gear is eccentrically mounted and operated by an output shaft of the punch press mechanism through one complete revolution for each complete cycle of operation of the press. The input gear drives an idler gear, and the idler gear in turn drives an output gear. The distance between the axes of rotation of the input and output gears is fixed and the idler gear has its axis of rotation connected to the eccentrically moving axis of rotation of the input gear through a first bar linkage and also connected to the fixed axis of rotation of the output gear through a second bar linkage.

By appropriate selection of the parameters, i.e. the ratio of diameters of the several gears, the spacing between the axes of rotation and the input and output gears, and the eccentricity of the input gear, it becomes possible for the output gear to dwell over a predetermined number of degrees of travel of the input gear as the input gear rotates eccentrically with a constant angular velocity. Drive means is coupled between the output gear and feed rollers of the feed drive mechanism of the invention, and by selection of the proper speed ratio between the output gear and the feed rollers, the predetermined amount of dwell of the output gear as determined by the above-mentioned parameters can be translated to a predetermined amount of dwell of the feed rollers, and thus also to a predetermined amount of linear travel of the strip toward the punch of the press.

In addition, means is provided for automatically releasing the feed rollers throughout the time that the strip is being securely held between the die shoe and punch to permit alignment of the strip with the punch. Moreover, the feed drive mechanism is so coordinated with the apparatus controlling the movement of the punch that the punch is in contact with the strip material only during the dwell time of the feed rolls.

Figure 1:
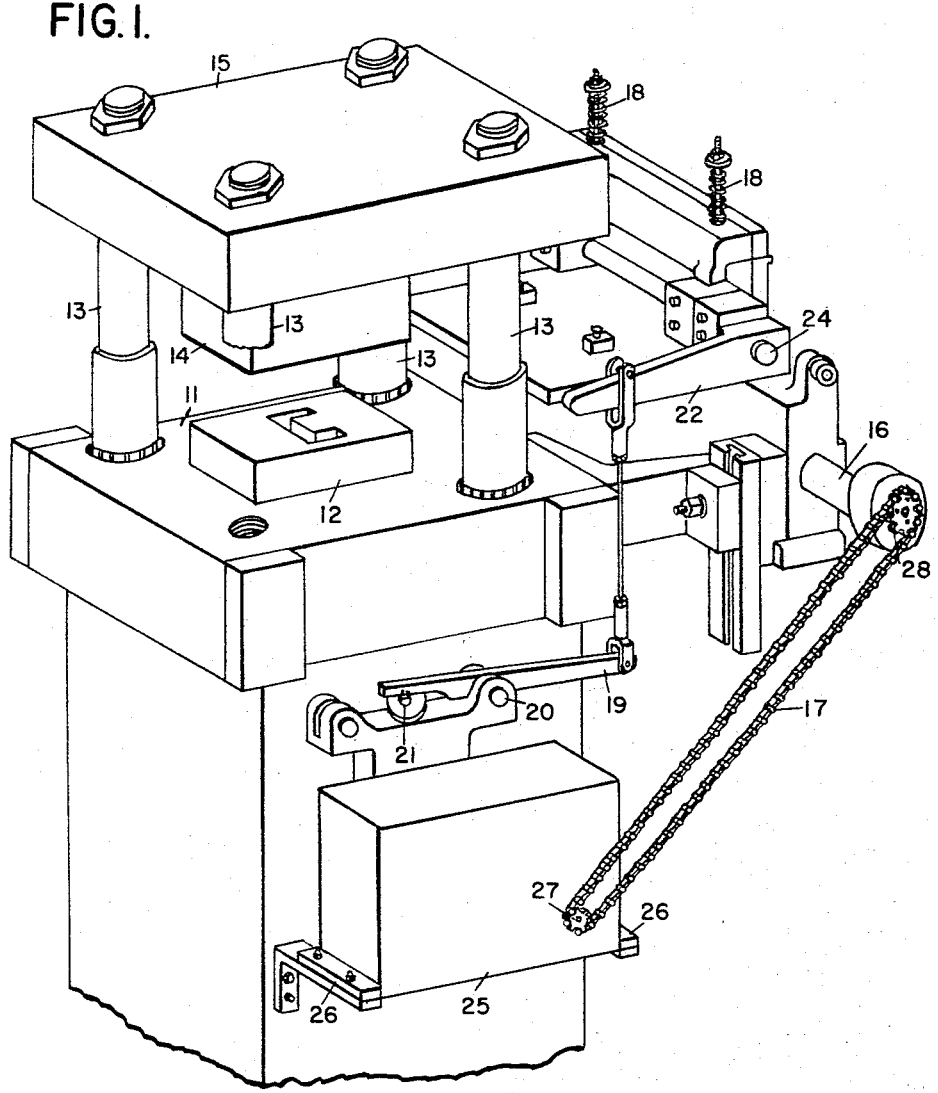
FIGURE 1 is a perspective view of a typical punch press having the feed drive mechanism of the present invention applied thereto.

FIGURE 1 illustrates a typical punch press comprising a base or frame 10 supporting a bed 11 to which the die shoe 12 is bolted. A plurality of slides or rams 13 are adapted to move up and down with respect to the bed 11. A punch 14 is supported by member 15 which is supported by slides 13. A source of motive power such as an electric motor (not shown) may be used to move the slides up and down through each of successive cycles of operation. Any of the numerous well-known types of mechanisms may be coupled between the motor and the slides such as a crank, cam, eccentric shaft, toggle joint, etc.

From the general description given thus far, it is apparent that the present invention has particular utility when used in connection with a multiple press having a gang of dies which are arranged to perform a series of operations in sequence on a piece of work. To simplify the illustration, however, only a single die shoe 12 and punch 14 are shown in FIGURE 1.

The material being acted upon by the punch press may be fed to the die members by a pair of feed rolls 84 and 85 (see FIGURE 4B) one of which, 84, is rotated as a result of rotation of the shaft 16 which is driven by chain 17. The two feed rolls are urged tightly against each other by means of springs 18 which bear downwardly on the upper of the two rollers, so that the strip material 86 (see FIGURE 4B) is frictionally engaged thereby and can thus be fed toward the punch.

A means is also provided for momentarily relieving the pressure of the feed rolls upon the strip. More specifically, an arm 19 is provided which is pivoted about a bearing 20 and is at times rotated clockwise about such bearing by reason of the fact that a push rod 21 is periodically and momentarily urged upwardly. The manner in which the push rod is actuated will subsequently be described in greater detail. In any event, the result of this rotation of lever 19 is a counter-clockwise rotation of lever 22 to which lever 19 is mechanically coupled by rod 23. The counter-clockwise rotation of lever 22 about its bearing 24 results in the raising of the upper roll 85 (FIGURE 4B) with reference to the lower roll 84 so that the strip material or the like being fed to the punches of the press is momentarily released.

The gear drive mechanism of a first embodiment of the invention is housed within a case 25 supported by L-shaped brackets 26, each of which is bolted to the case 25 and also to the side of the base 10 of the punch press. A punch press is normally provided with an output shaft that is coupled to the source of motive power in such a way that it makes one complete revolution for each complete punching cycle of the press. Such a shaft is provided to facilitate the coupling thereto of one of the prior art types of feed mechanisms. This shaft (not shown) is directly coupled to the input shaft 33 (FIGURE 2) of the gear drive mechanism housed in casing 25. The output shaft of the gear drive mechanism has affixed thereto a pinion 27 which is coupled to gear 28 by means of chain 17. For each cycle of operation of the press resulting in one complete rotation of the input shaft 33, there is a predetermined amount of angular motion of the pinion 27 and also a predetermined amount of dwell. Depending upon the ratio of gears 27 and 28, the predetermined amount of angular rotation of pinion 27 occurring each cycle is translated into a predetermined amount of rotation of gear 28 which is in turn translated into a given amount of linear travel of the strip material 86 toward the punch.

The gear drive mechanism of one embodiment of the present invention is illustrated in greater detail in FIGURES 2 and 3. FIGURE 2 is a plan view in cross section showing the side walls 30 and end walls 31 of the casing which encloses the various parts of the gear drive mechanism. FIGURE 3 illustrates the bottom plate 32 and the top plate 33 as well as the end walls 31. The casing comprises generally a box-like structure which is preferably substantially entirely closed so as to protect the various gears enclosed thereby and to protect also the operator of the machine.

Referring to FIGURE 2, an input shaft 33 is provided which rotates within a bearing surface defined in the side wall 30 of the casing. The shaft 33 is formed in part of a cylindrical shaft portion 34 which is splined at 35 so as to permit the shaft to be directly coupled to an output shaft (not shown) of the punch press which output shaft, as previously explained, makes one complete revolution for each cycle of operation of the punch press. Shaft 33 also comprises a circular portion 36 having a circular recess at 37 which is eccentrically located relative to the axis of shaft 33 and is adapted to receive a splined shaft 38.

The details of the shaft 33 and splined shaft 38 are shown in greater detail in FIGURES 3A and 3B. The shaft 33 is shown together with its circular portion 36 having the circular recess at 37. The eccentric shaft 33 is also illustrated as having a transverse slot at 40 which communicates with the circular hole 37. Rotation of the shaft 38 within the circular hole 37 is prevented by means of the key 41 which abuts against the shoulder 42 formed in the end of shaft 38. Key 41 is held in position in slot 40 by means of two machine screws 43 which are threaded into tapped holes provided in the circular portion 36 of shaft 33.

It will be readily evident that the eccentric location of the hole 37 in circular member 36 with respect to the axis of rotation of shaft 33 produces an eccentric operation of the shaft 38 as shaft 33 is rotated by the output shaft of the punch press.

FIGURES 3A and 3B relate particularly to the eccentric drive associated with input shaft 33, but FIGURE 3 shows that the opposite end of splined shaft 38 is supported in a similar manner at its opposite end by an eccentric shaft drive 45 which is similarly journalled in a bearing surface 46 formed in the side wall 30 of the casing.

Keyed to shaft 38 is a pinion gear 47 whose teeth mesh with an idler gear 48 which is rotatable about a shaft 49. Gear 48, in turn, drives gear 50 which is keyed to shaft 51 journalled within suitable bearings provided in apertures in the side walls 30 of the casing. Rotation of shaft 33 results in rotation of gear 47 but with the axis of rotation of gear 47 moving eccentrically with respect to the axis of shaft 33. The rotation of gear 47 nevertheless produces rotation of gear 48 which, in turn, rotates gear 50 and with it the shaft 51 to which is keyed a pinion gear 52 which meshes with a gear 53 splined to an output shaft 54. Shaft 54 is similarly journalled within suitable bearings and has keyed thereto at one a pinion gear 27 which is illustrated in FIGURE 1 as driving the chain 17.

FIGURE 2 shows shafts 38 and 49 coupled together by one or more links 60. Each link is free to rotate both with respect to shaft 38 and with respect to shaft 49. Similarly, shaft 49 is coupled to shaft 51 by one or more links 61. Links 61 are similarly free to rotate relative to both shafts 49 and 51. Thrust bearings are shown for the output shaft 51 at 62–66. Similar thrust bearings are provided for shaft 38 at 67–70, while thrust bearings 71 and 72 are provided for shaft 33. With respect to shaft 49, thrust bearings are provided at 75–80.

Referring to FIGURE 3, it can be seen that the rotation of gear 47 not only rotates gear 48, but also, by reason of the eccentricity of gear 47, and by reason of the fact that shaft 33 is directly coupled to shaft 49 by links 60, results in a rotation of the axis of shaft 49 about the axis of shaft 51.

From FIGURE 3 it can be seen that the direction and rate of rotation of shaft 49 about the axis of shaft 51 is dependent upon the angular position of eccentric gear 47, assuming that the latter rotates with a constant angular velocity. When the axes of shafts 38, 33, and 49 are all in alignment, i.e. lying in the same plane, the rate of rotation of shaft 49 about the axis of shaft 51 reduces to zero. Such alignment occurs twice per revolution of shaft 33, once when the axis of shaft 38 lies between the axes of shafts 33 and 49, and once when it lies outside. From either of these two reference points, shaft 49 rotates in one direction about shaft 51 for one-half revolution of eccentric gear 47 and in the opposite direction for the remaining half revolution. More specifically, starting from the position where the axes of shafts 38, 33, and 49 are aligned but with the axis of shaft 38 lying between the other two axes, and assuming that eccentric gear 47 is rotating in a counterclockwise direction, the axis of shaft 49 will from that point on begin to rotate in a counterclockwise direction about shaft 51 and will continue to do so until the three shafts are again aligned but with the axis of shaft 38 now lying outside of the line segment joining the axes of shafts 49 and 51. From that point on and back to the initial position, shaft 49 rotates in a clockwise direction about shaft 51.

The rotation of the axis of shaft 49 about shaft 51, coupled with the rotation of gear 48 itself combine to produce a variable velocity of the output gear 50. More specifically, assume that the eccentric gear 46 starts rotating counter-clockwise from the position where the three axes mentioned above are all in alignment but with the axis 38 lying without the axes of shaft 33 and 49, there will simultaneously be a clockwise rotation of gear 48 and a clockwise rotation of the axis of shaft 49 about the axis of shaft 51. By suitable adjustment of the various parameters involved, particularly the ratios of the several gears, the eccentricity of gear 47, and the distance between the axes of shafts 33 and 51, there will be a range of rotation of gear 47 which will result in no rotation of gear 50 and thus no rotation of the output gear 27. Apparently, through a given range of rotation of eccentric gear 47, the amount of rotation which would otherwise be imparted to gear 50 as a result of the rotation of gear 48 is almost precisely compensated for by the rotation of the axis of shaft 49 about the axis of shaft 51 so that gear 48, although rotating slightly, is in effect at the same time rotating about gear 50 with the result that gear 50 remains motionless.

Extensive experimentation has shown that numerous combinations of parameters will result in a satisfactory amount of dwell of the output gear 50. One specific combination of such parameters which has been found to be highly useful in producing a substantial amount of dwell at the output gear is that wherein the eccentric gear 47 has a diameter of two inches, the idler gear 48 a diameter of six inches, and the output gear 50 a diameter of four inches. Moreover, the spacing between the axes of the eccentric gear 47 and output gear 50 is chosen to be seven and three-quarter inches and the eccentricity of the input gear 47 is equal to 0.625 inch. With this combination of parameters, it is found that the output gear 50 will dwell through 95° of rotation of the input gear 47. Although the selection of parameters is not highly critical, it is nevertheless of real importance since combinations of parameters can readily be found that will produce no dwell of gear 50 and other combinations will produce a momentary reversal of gear 50.

Referring to FIGURE 5, an eccentric input gear 47, idler gear 48, and output gear 50 are shown in the positions they assume at a particular portion of the operating cycle. Various parameters which affect the amount of dwell are designated with appropriate reference characters. Thus, A designates the axis of revolution of the eccentric input gear 47 whose center is at D; B denotes the point of contact between the gears 47 and 48; C, the point of contact between gears 48 and 50; and E, the axis of rotation of output gear 50. The reference characters $r_1$, $r_2$, and $r_3$ designate the respective radii of gears 47, 48, and 50.

It has been determined that dwell occurs when the points A, B, and C of FIGURE 5 all lie along the same straight line and when angle DAB is equal to 90°. Actually, dwell of the output gear starts somewhat before the time that angle DAB reaches 90° and extends beyond that point, but it has nevertheless been found that dwell will occur when both of the above conditions are simultaneously met. The foregoing conditions further make it possible to determine the optimum distance between points A and E for maximum dwell. Thus, from the cosine formula, it can be determined that the distance of separation, AE, equals $$\sqrt{AC^2 + r_3^2 + 2AC \cdot r_3 \cos \alpha}$$

where $$\alpha = \sin^{-1} e/r_1$$
$$AC = AB + BC$$
$$= r_1 \cos \alpha + 2r_2 \cos \alpha$$

It has further been determined that, in general, the duration of dwell increases as the eccentricity $e$ increases. However, there are practical limits to the amount of eccentricity since, if this becomes excessive, there may be a slight reversal of the direction of rotation of output gear 50 and it may also become difficult to turn input gear 47 through a part of its cycle. As one example, if the relative sizes of the several gears is such that $r_1$ equals one inch, $r_2$ equals 3 inches, and $r_3$ equals two inches, then the input gear 47 becomes difficult to turn when the eccentricity $e$ is greater than .875 inch.

It is known in the prior art to drive an output gear through an idler gear and from an eccentrically rotating input gear. The Belin Patent No. 1,807,889 illustrates such an apparatus, but the Belin apparatus differs from that disclosed herein in that not only the input gear but also the output gear of Belin rotates eccentrically. Moreover, Belin does not disclose a combination in which the output gear dwells. A three-gear arrangement where the output gear is not eccentrically operated is shown in the magazine Product Engineering, in the issue of June 8, 1964, at page 68. It is disclosed there that the output gear of such a geared combination can pulsate, dwell briefly, or even reverse briefly. However, there is no disclosure therein of a suitable combination of various parameters to provide the necessary amount of dwell for use in the feeding of strip material to a punch press or the like, nor is there disclosed any adaptation of such apparatus to the control of the feeding of strip material to such a machine.

Referring now to FIGURES 4A and 4B, FIGURE 4B illustrates diagrammatically a punch press corresponding to that shown in FIGURE 1, and also illustrates diagrammatically the gear drive feed mechanism of the present invention. FIGURE 4B illustrates the input gear 47, idler gear 48, and output gear 50. Pinions 52 and 53 are shown as well as gear 27 which drives chain 17 to produce rotation of the lower feed roller 84. FIGURE 4B also clearly shows the upper roller 85 and the strip material 86 which is fed to the punch press between the two rollers 84 and 85. FIGURE 4B further illustrates an idler roller 87 which may be employed to use the slack in the drive chains 17 with the idler roller being spring biased to a position where it produces tension on such chain by means of the spring 88. In addition, FIGURE 4B illustrates a protuberance or cam-like projection 83 which may be placed either upon the shaft 33 or may instead be affixed to the output shaft of the punch press which is coupled directly to the shaft 33. In any event, it is this protuberance 83 which, on every revolution of shaft 33, actuates the push rod 21, thereby rotating lever 19 and producing a momentary release of the strip material 86 by the feed rollers 84 and 85.

FIGURE 4A illustrates diagrammatically the angular relationships involved among the several parts and shows the shaft 33 in such position that the eccentric gear 47 is in the topmost position. FIGURE 4A also shows that the protuberance 83 is position 180° opposite the eccentric gear 47. An angle of 25°–45° is designated in FIGURE 4A and is disposed symmetrically about the 180° position relative to the position of eccentric gear 47. This 25°–45° angle represents that portion of the complete cycle of operation wherein the strip material 86 is actually being held and punched by the die members of the punch press. The larger 95° angle diagrammatically illustrated represents that portion of the complete cycle in which the output gear and thus the feed rollers are in a state of dwell so that material is not being fed toward the die members. The remainder of the complete 360° cycle of operation, i.e. 255°, is devoted to the feeding of the strip material. The condition shown in FIGURE 4A is that wherein the slides 13 are at their topmost position so that the punch 14 is at the top of its stroke.

Starting with the initial position shown in FIGURE 4A (hereinafter considered as a zero degree reference point), and assuming a counter-clockwise direction of rotation of shaft 33, the first 127½° of rotation in the counter-clockwise direction is accompanied by a lowering of the slides 13 and a downward movement of the punch 14 toward die shoe 12. As shaft 33 is rotated to the position where the center of shaft 38 reaches the 127½° angular position, the dwell of the output gear 50 starts. From this point onward, there is no further feed of the strip material and it is held motionless relative to the punch, preparatory to the actual punching operation. This is the condition illustrated in FIGURE 4C. The corresponding view of FIGURE 5B shows that the beginning of dwell occurs substantially at the point where the axes of shafts 38, 33, and 49 are aligned with each other, and with the axis of shaft 38 lying without the line segment connecting the axis of shaft 33 and the axis of shaft 49. FIGURE 4D also shows that the punch 14 and die shoe 12 are closely adjacent each other but not yet quite in contact.

From this point on, however, the strip material 85 will not be fed further toward the die members because of the commencement of dwell of the output gear 50 as shaft 33 rotates further and reaches the angular position shown in FIGURE 4E, i.e. 157½° from the zero position shown in FIGURE 4A. This is the position in which the die shoe 12 and punch 14 are each in contact with and tightly holding the strip material 85. From this point on, the actual punching operation commences, and the portion of the cycle then commencing is designated as "stripper pinch."

Figure 4I:
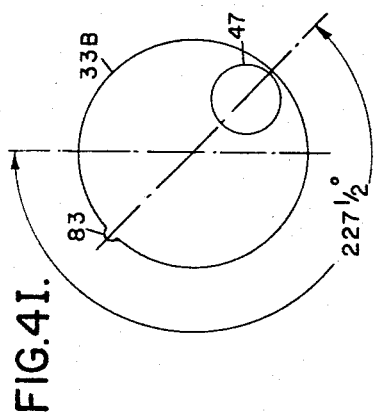
Figure 4J:
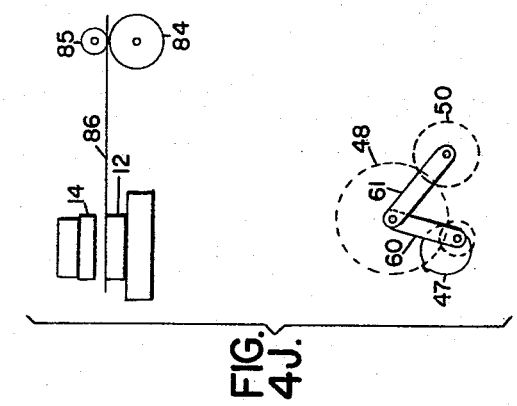
Figure 4G:
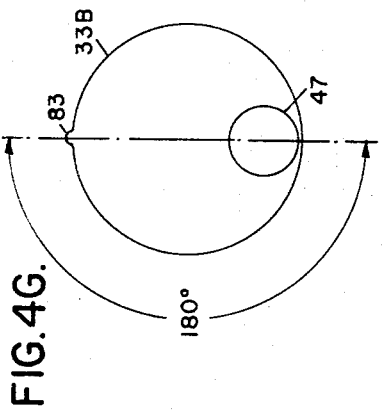
Figure 4H:
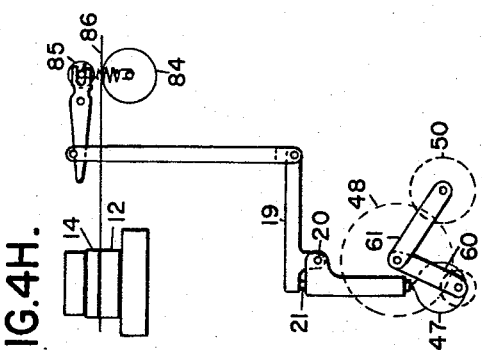

In FIGURE 4G, the shaft 33 has been rotated further in a counter-clockwise direction from the position shown in FIGURE 4E to the point where the eccentric gear 47 is in its lowermost position. This places the protuberance 83 at its topmost position where it actuates the push rod 21 upwardly so as to rotate lever 19 about pivot 20, thereby resulting in an upward movement of roller 85 with respect to the lower roller 84. This momentary release of the rollers occurs substantially half-way through the stripper pinch portion of the cycle, at a time when the strip 85 is securely held between punch 14 and die shoe 12. As mentioned before, this momentary release of the rollers makes it possible for the strip to be properly aligned with that portion of the strip then held by the stripper plate and thereby eliminate kinking and binding of the strip 85.

It has been assumed thus far in the detailed description that no registering holes and registering pins for exact alignment of the strip material are required. As previously mentioned, however, the use of the strip feed apparatus disclosed herein is not limited to the situation where registering pins and registering holes are dispensed with, but that it is entirely practical to use the registering holes and pins for precise alignment where deemed necessary. Of course, when the registering holes and pins are employed, it then becomes necessary to provide a momentary release of the rollers just prior to the registration of the strip by means of the registering pins, and the manner in which the release of the rollers is accomplished to effect this purpose will be more fully described in connection with the alternative embodiment of the invention illustrated in FIGURES 7–10.

In FIGURE 4I, the shaft 33 is shown as having been rotated substantially 227½° from the initial position, and it is now in the position where the dwell of the output gear 50 terminates. As shown in FIGURE 4J, the punch 14 and die shoe 12 are now separated so that the beginning of the feed can now occur as the strip 85 is no longer being held by the punch. FIGURE 4J also shows the relative positions of the several gears of the feed drive mechanism.

As mentioned previously, one of the outstanding characteristics of the feed drive mechanism of this invention is the gradual acceleration and deceleration of the feed rollers thereby virtually eliminating slippage and thereby greatly enhancing the accuracy of the feed of the strip.

In the description given heretofore with reference to FIGURES 4A–4J, the specific angles set forth are given primarily for the purpose of illustrating the mode of operation of the invention and are the angles which are obtained when the parameters are selected in accordance with those previously stated. When it is desired that the amount of feed be adjusted to different values, this can be accomplished in any of several ways. One way in which this can be accomplished is to change the diameter of the feed roller 84 so that, for a given angular rotation of output gear 50, there will be a different amount of linear travel imparted to the strip 85 by the two feed rollers. This expedient is necessarily a fairly expensive one because it requires that various sizes of rollers be kept in stock, one for each different amount of linear travel of the strip that is desired. An alternative way in which to vary the feed distance is to change the ratio of the gears 27 and 28 over which the chain 17 travels. It will be apparent that an increase in the size of gear 27 relative to gear 28 will result in a decrease in the amount of linear travel of strip 85 for a given amount of angular rotation of output gear 50. A still further way in which to vary the amount of linear travel of strip 85 is to employ a variable speed drive mechanism between the output gear 50 and the feed roller 84 in place of the chains 17. Various types of variable speed drives are known in the art and may be employed for this purpose. Such a variable speed drive mechanism is illustrated diagrammatically in FIGURE 6. The pinion 27 rotates pinion 98 of the variable speed drive mechanism 96 through chain 95. An output pinion 99 is coupled to pinion 28 through chain 97. Manual control 100 is provided by the variable speed drive mechanism 96. By this means, a given amount of angular rotation of pinion 27 for any one cycle of operation of the press is converted to a predetermined and desired amount of rotation of the feed rolls through rotation of pinion 28.

An alternative embodiment of my invention is illustrated in FIGURES 7, 8, 9 and 10. Thus, it is to be understood that the apparatus of FIGURES 7, 8 and 9 may be used instead of the multi-gear mechanism of FIGURES 2 and 3 to provide the desired motion of the feed rollers.

Referring to FIGURE 1, which shows a case 25 which, as already described, provides a housing for the gear mechanism of FIGURES 2 and 3, it is to be understood that the mechanism of FIGURES 7, 8 and 9 may instead be installed in the case 25. As shown in FIGURE 7, this alternative mechanism comprises both an input shaft 110 and an output shaft 111, and the input shaft 110 is directly coupled to an output shaft (not shown) of the punch press, whereas the output shaft 111 of FIGURE 7 drives the pinion 27 shown in FIGURE 1 so as to impart rotary motion to the feed rollers.

It will be appreciated by those skilled in the art that the mechanism of FIGURES 7, 8 and 9 comprises a modified Geneva cam arrangement. Thus, the input shaft 110 is journalled within the housing 112 by bearings 113 and 114, and at the right hand end of the shaft 110 is provided an eccentric cam member 115 which is shown in greater detail in FIGURE 9. Keyed to the output shaft 111 is a gear member 116 which is shown in greater detail in FIGURE 8. The output shaft, incidentally, is journalled in the housing 112 by means of bearing 117 and 118.

The eccentric cam member 115 is provided with a circular cam surface at 119 and this surface 119 at times mates with a correspondingly curved surface 120 in gear member 116. Referring to FIGURE 8, when the member 115 is in the position shown so that the curved surfaces 119 and 120 are in juxtaposition, the gear member 116 is obviously not free to rotate, and it is this condition which establishes the dwell time of the gear member 116 and thus of the output shaft 111. However, it will be noted that the cam member 115 also supports a cam drive element 121 which is adapted to fit within the opposing side walls forming the grooves 122 which are equally spaced angularly over the surface of gear member 116. When shaft 110 rotates to a position wherein member 115 has its curved surfaces 119 at the point of disengagement with the opposing curved surface 120, then the cam member 121 will enter an adjacent one of the slots 122 so that angular rotation of gear member 116 is produced in response to continued rotation of input shaft 110.

Since there are six of the slots 122 disposed at equidistant intervals about the surface of gear member 116, it follows that the gear member 116 dwells throughout 120° of rotation of the input shaft 110 and will be angularly advanced during the remainder of each complete revolution of the input shaft 110.

FIGURE 10 comprises a timing cycle diagram which illustrates in a simplified manner the sequence of events involved in a complete cycle of operation of the punch press. The circle shown in FIGURE 10 represents a complete cycle of operation of the punch press, and the top of the circle represents the punch in the topmost position while the bottom of the circle represents the punch in its bottommost position when the die is in a punching position with respect to the strip material. FIGURE 10 shows that the dwell of the feed rolls takes place throughout 120° of a complete cycle of operation, and the apparatus of FIGURES 7–9 is so arranged as to assure that the amount of dwell time is centered about the bottommost position of the die, i.e. the dwell time starts at about 60° prior to the time that the die reaches its bottommost position and persists for about 60° after the die begins to retract upwardly from its bottommost position.

FIGURE 10 further shows that after the dwell time has begun at time $a$, but prior to the time that the stripper plate contacts the material, the feed rolls are lifted at point $b$. Thus, it is assumed in this embodiment of the invention that one or more guide pins are used to properly position the feed material prior to the time that it becomes fixed in position by the stripper plate, and it is for this reason that the feed rolls release the strip material prior to the time that it is gripped by the stripper plate so as to permit accurate positioning of the strip by the guide pins. At time $c$, the stripper plate grips the material and from this time until time $e$, the material is thus held while the actual punching operation takes place. At time $d$, the feed rollers are again brought into contact with the material, and thereafter, at time $e$, the material is released by the stripper plate. At time $f$, the dwell of the feed rolls stops, and the strip material is then moved forwardly.

The description of FIGURES 7–10 has assumed the use of registering pins and corresponding registering holes in the strip material to provide precise alignment of the strip material relative to the die, and it has been described how the feed rolls release the strip material just prior to the time when the pins effect alignment of the strip. It should be understood that the feed roll release portion of the apparatus disclosed in FIGURES 7–10 can also be incorporated in the embodiment of the invention shown in FIGURES 2–5.

From the description that has already been given with respect to FIGURES 4E–4J, it will be readily understood how a cam-like protuberance on either the output shaft (not shown) of the punch press or on the input shaft 110 of the mechanism of FIGURE 7 will accomplish actuation of the elements 19, 20, 21, 22, and 24 shown in FIGURE 1 to effect a release of the feed rolls at the desired time in the cycle.

Having described two embodiments of feed drive mechanism for a punch press as specific embodiments of my invention, I wish it to be understood that various modifications and alterations may be made to the specific forms shown without in any manner departing from the spirit and scope of my invention.

What I claim is:

1. In combination, a punch press or the like having a die shoe and punch and means for moving said punch relative to said die shoe from a non-punching position to and through a strip material engaging and punching position and thence back to said non-punching position on each successive cycle of operation of said press, a shaft rotating through a full revolution for each said cycle of operation, an input gear rotating eccentrically about a first fixed axis, means responsive to rotation of said shaft for rotating said input gear one full revolution for each revolution of said shaft, an output gear rotating about a fixed second axis, an idler gear rotating about a movable third axis, means for maintaining said idler gear in mesh with both said input and output gears, whereby said output gear dwells throughout a predetermined amount of angular rotation of said input gear, said shaft and said means rotating said input gear being so arranged that said dwell of said output gear occurs throughout that portion of each said cycle of operation of said press wherein said punch and die shoe are in a material engaging position, and means responsive to rotation of said output gear for moving said strip material toward said punch, said last-named means including a variable speed drive means having an input means responsive to rotation of said output gear, an output means for advancing said strip material, and control means for varying the speed ratio between said input means and said output means.

2. Strip material feed apparatus for a punch press or the like of a type having a die shoe moved on each cycle of operation from an initial material non-engaging position to and through a position where said strip material is punched and then back to its said initial position and having a shaft which rotates a predetermined amount on each such cycle, said strip feed apparatus comprising in combination, an input gear rotatable eccentrically about a first fixed axis, means responsive to rotation of said shaft for rotating said input gear one full revolution for each said cycle of operation, an output gear rotating about a fixed second axis, an idler gear rotating about a movable third axis, means for maintaining said idler gear in mesh with both said input and output gears, said shaft and said means rotating said input gear being so arranged that a dwell of said output gear occurs at least throughout that portion of each said cycle of operation wherein said punch is in said material punching position, and means responsive to rotation of said output gear for moving said strip material toward said punch, said input, output and idler gears being so arranged that said first axis A, the point of tangency B of said first gear and said idler gear, and the point of tangency C of said output gear and said idler gear, all lie in the same straight line and simultaneously the angle DAB forms a right angle at some rotational position of said input gear to thereby produce dwell of said output gear.

3. The apparatus of claim 2 wherein the distance between said first axis and said second axis is made substantially equal to $$\sqrt{AC^2 + r_3^2 + 2\overline{AC} \cdot r_3 \cos \alpha}$$

where $$\alpha = \sin^{-1} e/r_1$$

and $$AC = r_1 \cos \alpha + 2r_2 \cos \alpha$$

4. The apparatus of claim 3 wherein said means for moving said strip material toward said punch includes at least one pair of rollers normally engaging opposite surfaces of said strip material, and means for momentarily releasing the pressure of said rollers on said strip material during the time of dwell of said output gear, said releasing means comprising cam means rotatable with said shaft and cam follower means actuated by said cam means for releasing said roller pressure.

5. The apparatus of claim 2 which further includes means for releasing the pressure of said rollers on said strip material only during the time that said die shoe is in said material engaging position.

6. Strip feed apparatus for a punch press or the like of a type having a die shoe moved on each cycle of operation from an initial strip material non-engaging position to and through a position where said strip material is punched and then back to its said initial position and having a first shaft which rotates through a complete revolution on each such cycle, said strip feed apparatus comprising in combination, a second intermittently rotated shaft, means responsive to rotation of said shaft for advancing said strip material toward said die shoe, said last-named means comprising at least one pair of feed rollers respectively engaging opposite surfaces of said strip material, Geneva-cam means operatively connecting said first shaft with said second shaft for revolving said second shaft a precisely controlled amount in response to each complete revolution of said first shaft and for maintaining said second shaft motionless throughout a predetermined portion of the revolution of said first shaft, means for momentarily releasing the pressure of said feed rollers on said strip material, said releasing means comprising cam means rotatable with said first shaft and cam follower means actuated by said cam means for releasing said roller pressure.

7. The apparatus of claim 6 which further includes variable speed drive means having an input operatively coupled to said second shaft and an output operatively coupled to said feed rollers, and means for varying the input-output speed ratio of said drive means.

References Cited

UNITED STATES PATENTS

| | | | |
|---|---|---|---|
| 2,658,406 | 11/1953 | McIlvain | 83—263 X |
| 2,858,718 | 11/1958 | Hautav | 74—84 |
| 3,099,180 | 7/1963 | Munschaver et al. | 83—263 X |
| 3,261,217 | 7/1966 | Schick | 74—84 |

WILLIAM W. DYER, JR., *Primary Examiner.*

J. M. MEISTER, *Assistant Examiner.*